United States Patent Office.

FRANCIS M. HILLSTREAM, OF LAWRENCE, KANSAS.

Letters Patent No. 103,614, dated May 31, 1870.

IMPROVED COMPOSITION MADE FROM COAL-TAR.

The Schedule referred to in these Letters Patent and making part of the same.

*To all whom it may concern:*

Be it known that I, FRANCIS M. HILLSTREAM, of Lawrence, in the county of Douglas and State of Kansas, have invented a new and improved Tar Resinite; and I do hereby declare that the following is a full, clear, and exact description thereof, which will enable others skilled in the art to make and use the same.

The object of this invention is to prepare coal-tar in such a manner that it may be used for building purposes, and for many purposes for which metal, clay, or other minerals are now employed.

The tar, which may at first be distilled, in order to liberate the light oils, benzine, &c., but which may also be used in its raw state, is mixed with the following ingredients: Sulphur, lead ore, charcoal, and slaked lime. These ingredients are pulverized and mixed with the molten tar, and boiled in the same for about thirty minutes. The composition is then drawn off into proper molds, in which it is allowed to cool. It will form a hard substance, which I prefer to name tar resinite. The same will be entirely water-proof, and can be used as a lining or wall for buildings, cisterns, &c., or even for drain-pipes, water-pipes, and conductors of all kinds.

The ingredients which are added to the tar serve to neutralize and bind the acidulous and volatile ingredients of the same, and make it, therefore, more durable and reliable than it would be without the addition.

By adding gravel, small stones, and other silicious substance to the mixture, the strength and durability of the same will be increased. An addition of glue or rubber will materially increase the toughness of the same.

The ingredients above set forth are used in about the following proportions for one hundred parts of tar, to wit: three parts of sulphur, three of lead ore, three of charcoal, and six of lime. By varying them more or less, the nature of the compound can be properly modified.

Having thus described my invention,

I claim as new and desire to secure by Letters Patent—

1. The composition herein described, called "tar resinite," and prepared as set forth.

2. The combinations of silicious ingredients with "tar resinite," as and for the purposes set forth.

FRANCIS M. HILLSTREAM.

Witnesses:
    I. H. LANE,
    R. E. TUCKER.